Dec. 21, 1937.  A. DE VRIES  2,102,999
FASTENER
Filed May 17, 1935
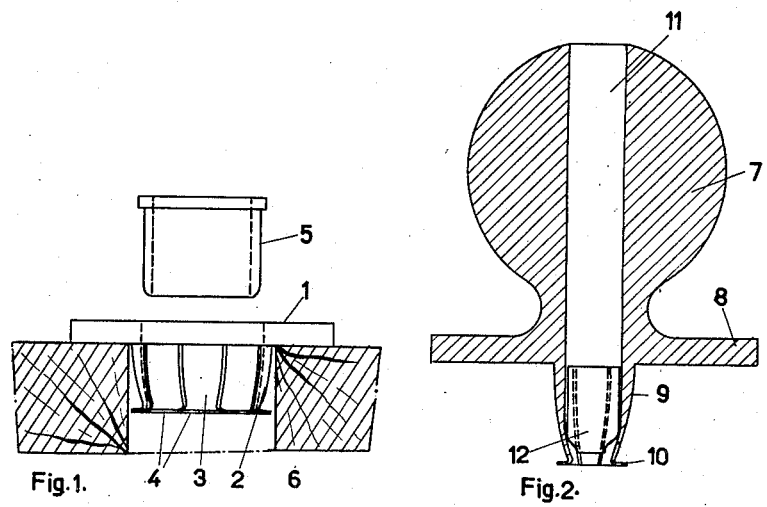
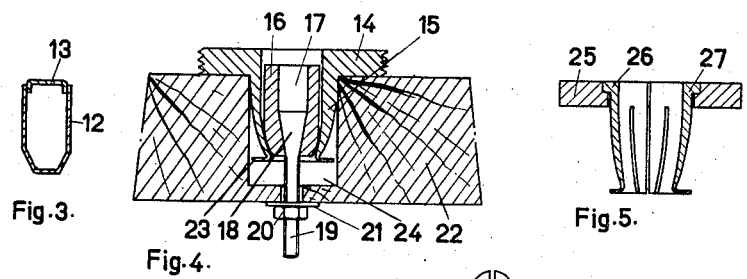
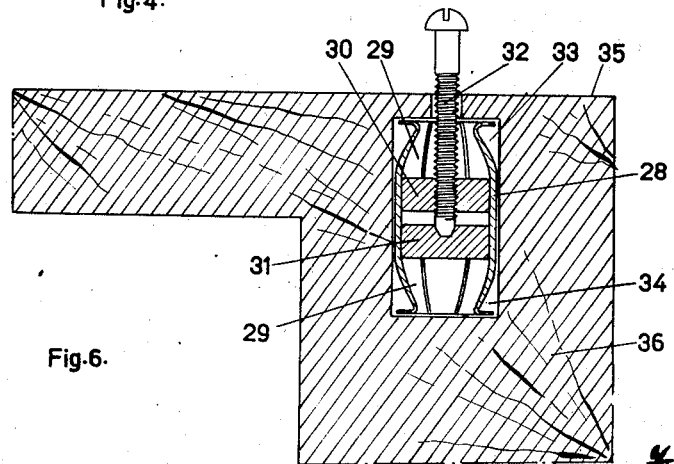

Patented Dec. 21, 1937

2,102,999

UNITED STATES PATENT OFFICE 2,102,999

FASTENER

Abraham de Vries, Amsterdam, Netherlands, assignor to Naamlooze Vennootschap Ijzerhandel I. M. de Vries, Amsterdam, Netherlands Application May 17, 1935, Serial No. 22,031 In Germany June 4, 1934

2 Claims. (Cl. 85—2.4)

My invention relates to means for fastening handles, knobs, locks, name plates, fittings and the like to wooden or other walls, doors or other supports and for fixing wooden or other boards or members together. The invention relates more particularly to fixing or fastening means of the kind which are hitherto held in place by means of screws or the like, and it is one of its objects to provide a fixing means which can readily be secured to a wooden door or wall without becoming loose as a result of shocks or vibrations, more particularly when only a thin layer of wood is available for this purpose.

The fixing means according to my invention comprises a number of tongues, preferably arranged in a circle and forming part of a sleeve, cup or the like which is made, in its preferred form, of metal and the wall of which is formed with a curved outer surface. Near their ends these tongues converge and may be forced outwardly by a mandrel or the like inserted between them. The free ends of the tongues are bent off the tongue bodies to extend substantially at right angles to the tongue axis and are preferably sharpened, so that, if the tongues are, for instance, inserted in a hole in the door or the like, a mandrel inserted therein will straighten the converging parts of the tongues and force their sharpened ends into the wood, whereby the sleeve is fixed in position in the hole. This sleeve may form part of or may be fastened to or inserted in a plate, handle, rosette or other member which shall be mounted on a door, wall or the like, and will then firmly connect such member with its support. Alternatively a sleeve of this kind may serve as a means for connecting two parts of a wooden or other structure, in which case I prefer to form it with converging tongues at either end which project into registering holes of the parts to be connected with each other.

Having thus explained the general character of my invention, I will now proceed to describe it in detail with reference to the drawing accompanying this specification and forming part thereof, which illustrates, by way of example and in a purely diagrammatic manner, several embodiments of my invention.

In the drawing—

Fig. 1 is an axial section of a rosette for a door handle or the like, which is formed with fastening tongues of the kind aforedescribed.

Fig. 2 is a similar view of a door-knob provided with similar means of fixation.

Fig. 3 illustrates a hollow mandrel adapted for use in combination with an expanding sleeve of the kind here in view.

Fig. 4 is an axial section of a rosette with expanding tongues and means, adapted to be actuated from the other side of the wall or door, for fixing same in position.

Fig. 5 is a similar view of a split sleeve countersunk in a rosette.

Fig. 6 illustrates the connection of two parts of a piece of furniture by means of an expanding fixture according to my invention.

Referring to the drawing and first to Fig. 1, 1 is an annular plate or rosette and 2 is the expansible slotted sleeve formed integral with the plate and consisting of a plurality of converging tongues 3, the free ends 4 of which extend approximately at right angles to them. 5 is the mandrel or expander serving, when driven into the sleeve 2, to force the tongues outwardly and to drive their sharpened ends into the wall of the boring formed in the door 6. The mandrel has the form of a metal sleeve into which a door handle may be inserted. Obviously the tongue ends 4 entering the wood will permanently fix the rosette to the door.

The door knob 7 shown in Fig. 2 is formed with a covering plate 8 and an extension 9 in the form of a slotted sleeve with outwardly directed tongue ends 10. Through the axial boring 11 of the knob a wedge or mandrel 12 can be forced into the sleeve 9 to expand and fix it and the knob in position.

The mandrel 12 may be formed as a cup (Fig. 3) closed by a cover 13.

Fig. 4 serves to illustrate the case where it is desired that the mandrel be forced into the expanding sleeve from the rear side. The rosette plate 14 is formed with a slotted sleeve 15 as before. The expander 16 is formed with a convergent boring 17 through which extends the conical end 18 of the screw bolt 19 on which a pull can be exerted by means of the nut 20 acting on a washer 21 which rests on the rear face of the door or wall 22. On the nut being screwed down on the bolt, the mandrel is pulled into the sleeve 15 and forces the sharpened ends 23 of its tongues into the wall of the cavity 24 formed in the wood.

Fig. 5 illustrates a plate 25 with a separate expanding sleeve countersunk therein, this sleeve being split lengthwise and consisting of two halves 26, 27.

Fig. 6 shows part of a piece of furniture or the like, in which two walls or a side wall and cover are firmly held together by means of an expanding sleeve according to my invention. Here the sleeve 28 is formed with convergent tongues 29 at either end and two separate expanding members 30, 31 are provided therein, one of which (30) forms a nut mounted on a screw 32, the inner end of which rests in a cavity of the other member 31. The head of the screw projects through a narrow boring, while the sleeve 28 is accommodated in the registering cavities 33, 34 formed in the abutting parts of the boards 35, 36 to be connected. When the screw is rotated, the nut-shaped expanding member 30 will be pulled towards the ends of the upper tongues and will cause them to spread, forcing their sharp ends into the inner wall of the cavity 33. At the same time the inner end of the screw will force the other member 31 downwardly, thereby causing the lower tongues to spread and their bent ends to enter the wall of the cavity 34, whereby the two boards 35, 36 are firmly connected to each other. Obviously, after the tongues have been spread, the screw may be withdrawn. On the other hand the screw may form part of or be connected with some part to be mounted on the wall or cover, such as a handle, a holder or the like and in that case it will be left in position in the members 30, 31.

Similarly the mandrels shown in Figs. 1 to 4 may form part of or may be connected with some member (handle, holder, knob etc.) intended to be permanently or temporarily connected with the wall, door, cover or the like, in which the expanding sleeve is arranged.

The modification shown in Fig. 5, in which an axially split sleeve is provided, can easily be removed, after the mandrel has been withdrawn.

Any part, which it is desired to fix in a hole or boring in a board, pole, door, wall or the like, if formed with an expanding sleeve or with converging tongues with laterally directed sharp edges of the kind hereabove described, can easily be fixed in place either permanently or temporarily.

Preferably the mandrel designed to cause the tongues to spread is formed with tapering walls as shown in Figs. 1 to 3, in order to enable it to exert a wedge-like action.

Obviously no closed circle of tongues is required and in many cases two diametrically opposed tongues may suffice to hold two pieces of wood together or a plate, rosette or the like on a board, wall, door etc.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim in the present application to any modification not covered by these claims is expressly reserved.

I claim:

1. A fastening member for furniture fittings of the kind fixed to a support and having a plurality of fastening tongues adapted to be expanded by a mandrel inserted inbetween, comprising a sleeve provided with narrow slots forming tongues which in the unexpanded position form a substantially continuous ring, said sleeve converging inwardly toward one end, said tongues being bent outwardly at said end substantially at right angles to the sleeve axis, the ends of said bent out portions being sufficiently thin as to penetrate into the support when expanded.

2. A fastening member for furniture fittings of the kind fixed to a support and having a plurality of fastening tongues adapted to be expanded by a mandrel inserted inbetween, comprising a sleeve provided with narrow slots extending substantially over the entire length of the sleeve so as to form tongues which in the unexpanded position form a substantially continuous ring, said sleeve converging inwardly toward one end, said tongues being bent outwardly at said end substantially at right angles to the sleeve axis, the ends of said bent out portions being sufficiently narrow as to penetrate into the support when expanded, and a flange provided at the other end of said sleeve and adapted to secure the same in a recess provided in said furniture fitting.

ABRAHAM DE VRIES.